US009306893B2

(12) United States Patent
Sharp et al.

(10) Patent No.: US 9,306,893 B2
(45) Date of Patent: Apr. 5, 2016

(54) SYSTEMS AND METHODS FOR PROGRESSIVE MESSAGE FLOW

(71) Applicant: Google Inc., Mountain View, CA (US)

(72) Inventors: Phillip Sharp, Mountain View, CA (US); David Nachum, San Francisco, CA (US); Keith Coleman, Palo Alto, CA (US); Xander Pollock, Palo Alto, CA (US); Jason Briggs Cornwell, Menlo Park, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/187,120

(22) Filed: Feb. 21, 2014

(65) Prior Publication Data

US 2015/0188870 A1   Jul. 2, 2015

Related U.S. Application Data

(60) Provisional application No. 61/922,601, filed on Dec. 31, 2013.

(51) Int. Cl.
*H04L 12/58* (2006.01)

(52) U.S. Cl.
CPC ..................................... *H04L 51/22* (2013.01)

(58) Field of Classification Search
CPC ........................... G06Q 10/107; H04L 12/581
USPC ............ 715/781, 752; 709/206; 707/738, 769
See application file for complete search history.

(56) References Cited

U.S. PATENT DOCUMENTS

| 4,914,650 | A | 4/1990 | Sriram |
| 5,948,040 | A | 9/1999 | DeLorme et al. |
| 6,044,260 | A | 3/2000 | Eaton et al. |
| 6,057,841 | A | 5/2000 | Thurlow et al. |
| 6,147,977 | A | 11/2000 | Thro et al. |
| 6,232,972 | B1 | 5/2001 | Arcuri et al. |
| 6,252,597 | B1 | 6/2001 | Lokuge |
| 6,333,973 | B1 | 12/2001 | Smith et al. |
| 6,351,764 | B1 | 2/2002 | Voticky et al. |
| 6,421,709 | B1 | 7/2002 | McCormick et al. |
| 6,507,866 | B1 | 1/2003 | Barchi |
| 6,700,591 | B1 | 3/2004 | Sharpe |
| 6,704,772 | B1 | 3/2004 | Ahmed et al. |
| 6,725,228 | B1 | 4/2004 | Clark et al. |
| 6,778,642 | B1 | 8/2004 | Schmidt, Jr. et al. |
| 6,961,341 | B1 | 11/2005 | Krishnan |
| 7,120,865 | B1 | 10/2006 | Horvitz et al. |
| 7,167,910 | B2 | 1/2007 | Farnham et al. |
| 7,194,516 | B2 | 3/2007 | Giacobbe et al. |
| 7,359,947 | B2 * | 4/2008 | Kelley et al. .................. 709/206 |

(Continued)

*Primary Examiner* — Jennifer To
*Assistant Examiner* — Jasmine Wan
(74) *Attorney, Agent, or Firm* — Morgan, Lewis & Bockius LLP (57) ABSTRACT

Systems and methods for managing electronic messages are disclosed. In some implementations, a method includes, at a computing device, causing an electronic message to be displayed to a user in an electronic message folder. Responsive to detecting that the user has read at least a portion of the electronic message, without user intervention, the electronic message is removed from the electronic message folder. In some implementations, the electronic message folder is a message inbox and the electronic message is removed from the message inbox to an archive or delete folder. In some implementations, the computing device includes one or more processors and memory storing one or more programs for execution by the one or more processors.

9 Claims, 8 Drawing Sheets

(56) References Cited

U.S. PATENT DOCUMENTS

| | | |
|---|---|---|
| 7,415,504 B2 | 8/2008 | Schiavone et al. |
| 7,421,690 B2 | 9/2008 | Forstall et al. |
| 7,429,993 B2 | 9/2008 | Hui |
| 7,475,120 B1 * | 1/2009 | Ngo et al. ............... 709/206 |
| 7,506,263 B1 | 3/2009 | Johnston et al. |
| 7,536,652 B2 | 5/2009 | Uemura et al. |
| 7,539,732 B2 | 5/2009 | Kelso et al. |
| 7,568,011 B2 | 7/2009 | Bocking et al. |
| 7,689,656 B2 | 3/2010 | McCarthy et al. |
| 7,730,137 B1 | 6/2010 | Toomey |
| 7,765,212 B2 * | 7/2010 | Surendran et al. ........... 707/738 |
| 7,788,329 B2 | 8/2010 | Barrett et al. |
| 7,814,155 B2 | 10/2010 | Buchheit et al. |
| 7,895,279 B2 | 2/2011 | Forstall et al. |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 * | 8/2011 | Gillum et al. ............... 726/23 |
| 8,010,613 B2 | 8/2011 | Oral et al. |
| 8,031,845 B2 | 10/2011 | Gruen et al. |
| 8,041,745 B2 | 10/2011 | Newton et al. |
| 8,065,369 B2 | 11/2011 | Turski et al. |
| 8,095,400 B2 | 1/2012 | Herde et al. |
| 8,108,469 B2 | 1/2012 | Kent, Jr. et al. |
| 8,140,703 B2 | 3/2012 | Morris et al. |
| 8,150,926 B2 * | 4/2012 | Sundararajan et al. ....... 709/206 |
| 8,150,930 B2 | 4/2012 | Satterfield et al. |
| 8,176,130 B2 | 5/2012 | Daniell |
| 8,224,902 B1 | 7/2012 | Glasser et al. |
| 8,230,350 B2 | 7/2012 | Dodsworth |
| 8,233,885 B2 | 7/2012 | Kansal et al. |
| 8,239,874 B2 * | 8/2012 | Anderson et al. ............ 719/314 |
| 8,281,382 B1 | 10/2012 | Sanyal et al. |
| 8,286,089 B2 | 10/2012 | Hardy et al. |
| 8,307,029 B2 | 11/2012 | Davis et al. |
| 8,375,307 B2 | 2/2013 | Kim |
| 8,375,400 B2 | 2/2013 | Sutedja et al. |
| 8,402,096 B2 | 3/2013 | Affronti et al. |
| 8,448,084 B2 | 5/2013 | Brichter |
| 8,499,042 B2 | 7/2013 | Brown, Jr. et al. |
| 8,499,048 B2 | 7/2013 | Malik et al. |
| 8,533,274 B2 | 9/2013 | Buchheit et al. |
| 8,560,619 B1 * | 10/2013 | Huston et al. ................. 709/206 |
| 8,572,277 B2 | 10/2013 | Morris et al. |
| 8,577,967 B1 | 11/2013 | Chavez et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 8,701,018 B1 | 4/2014 | Keel et al. |
| 2002/0143871 A1 | 10/2002 | Meyer et al. |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0177190 A1 | 9/2003 | Moody et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0078190 A1 | 4/2004 | Fass et al. |
| 2004/0153456 A1 | 8/2004 | Charnock et al. |
| 2004/0254998 A1 | 12/2004 | Horvitz |
| 2005/0004990 A1 | 1/2005 | Durazo et al. |
| 2005/0018819 A1 | 1/2005 | Schmidt, Jr. et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0138552 A1 | 6/2005 | Venolia |
| 2005/0193076 A1 | 9/2005 | Flury et al. |
| 2005/0193345 A1 | 9/2005 | Klassen et al. |
| 2005/0246658 A1 | 11/2005 | Uemura et al. |
| 2005/0256968 A1 | 11/2005 | Johnson |
| 2006/0010215 A1 | 1/2006 | Clegg et al. |
| 2006/0031340 A1 | 2/2006 | Mathew et al. |
| 2006/0031347 A1 * | 2/2006 | Sahi ............................. 709/206 |
| 2006/0059238 A1 | 3/2006 | Slater et al. |
| 2006/0064410 A1 | 3/2006 | Razza et al. |
| 2006/0069734 A1 | 3/2006 | Gersh et al. |
| 2006/0075044 A1 * | 4/2006 | Fox et al. ..................... 709/206 |
| 2006/0095466 A1 | 5/2006 | Stevens et al. |
| 2006/0123360 A1 | 6/2006 | Anwar et al. |
| 2006/0173824 A1 | 8/2006 | Bensky et al. |
| 2006/0173961 A1 | 8/2006 | Turski et al. |
| 2006/0206495 A1 | 9/2006 | Van Gageldonk et al. |
| 2007/0005592 A1 | 1/2007 | Kender et al. |
| 2007/0106729 A1 | 5/2007 | Adams et al. |
| 2007/0156669 A1 | 7/2007 | Marchisio et al. |
| 2007/0262861 A1 | 11/2007 | Anderson et al. |
| 2007/0277113 A1 * | 11/2007 | Agrawal et al. .............. 715/764 |
| 2007/0299923 A1 * | 12/2007 | Skelly et al. .................. 709/206 |
| 2008/0215687 A1 * | 9/2008 | Madnani ...................... 709/206 |
| 2010/0030798 A1 | 2/2010 | Kumar et al. |
| 2010/0049806 A1 * | 2/2010 | Haynes et al. ................ 709/206 |
| 2010/0114855 A1 | 5/2010 | Li et al. |
| 2010/0199180 A1 | 8/2010 | Brichter |
| 2010/0262922 A1 * | 10/2010 | Fan et al. ..................... 715/752 |
| 2010/0278453 A1 | 11/2010 | King |
| 2011/0010182 A1 * | 1/2011 | Turski et al. .................. 705/1.1 |
| 2011/0072363 A1 | 3/2011 | Mandel et al. |
| 2011/0231499 A1 * | 9/2011 | Stovicek et al. .............. 709/206 |
| 2011/0289106 A1 * | 11/2011 | Rankin et al. ................ 707/769 |
| 2012/0102037 A1 | 4/2012 | Ozonat |
| 2012/0131095 A1 | 5/2012 | Luna et al. |
| 2012/0180021 A1 | 7/2012 | Byrd et al. |
| 2012/0198053 A1 * | 8/2012 | Ozhan et al. .................. 709/224 |
| 2012/0210334 A1 | 8/2012 | Sutedja et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 | 2/2013 | Spierer |
| 2013/0110953 A1 | 5/2013 | Sutedja et al. |
| 2013/0159879 A1 | 6/2013 | Affronti et al. |
| 2013/0165165 A1 | 6/2013 | Macek et al. |
| 2013/0166280 A1 | 6/2013 | Quast et al. |
| 2013/0212189 A1 | 8/2013 | Velissarakos |
| 2013/0297604 A1 | 11/2013 | Sutedja et al. |
| 2013/0305187 A1 | 11/2013 | Phillips et al. |
| 2013/0325705 A1 | 12/2013 | Laird et al. |
| 2013/0332850 A1 | 12/2013 | Bovet et al. |
| 2014/0052797 A1 * | 2/2014 | Lessard et al. ................ 709/206 |
| 2014/0096032 A1 | 4/2014 | Mayblum et al. |
| 2014/0115495 A1 | 4/2014 | Wetherell et al. |
| 2014/0279016 A1 | 9/2014 | Capel et al. |

* cited by examiner

SYSTEMS AND METHODS FOR PROGRESSIVE MESSAGE FLOW

RELATED APPLICATIONS

This application claims priority to U.S. Provisional Application No. 61/922,601, entitled "Systems and Methods for Progressive Message Flow," filed Dec. 31, 2013, which is hereby incorporated by reference herein in its entirety.

This application is related to U.S. patent application Ser. No. 14/139,205, entitled "Systems and Methods for Clustering Electronic Messages," filed Dec. 23, 2013, which is hereby incorporated by reference herein in its entirety.

TECHNICAL FIELD

The implementations disclosed herein relate generally to managing electronic messages.

BACKGROUND

Nowadays, a user on average receives hundreds, if not thousands, of electronic messages a day. Overwhelmed by such a large influx of messages (e.g., social network updates and marketing materials), in some cases, a user may encounter great difficulty keeping a message folder (e.g., an email inbox) well organized. For example, despite scant interest in marketing emails, users may passively (e.g., by way of inaction) allow them to stay in their inboxes—rather than acting affirmatively to remove these unwanted emails, e.g., moving them to a trash or spam folder. Because the former does not require upfront user efforts, while the latter might.

Difficulties abound with maintaining message folders in this manner, however. One technical problem is that once a message folder grows large (e.g., filled with a significant number of unwanted messages), maintenance efforts may increase dramatically and soon become prohibitive. Worse, users feeling overwhelmed by unwanted messages may lose interest in maintaining or organizing a message folder in the future, further exacerbating the situation. For example, seeing that their inboxes now include more than 200 marketing ads and social network updates, users may choose to abandon their inboxes altogether in favor of a clean slate (e.g., a brand new email address). From a user's perspective, frustration may arise. From a service provider's perspective, user retention may suffer, and maintenance cost (for unwanted messages idling in users' inboxes) may skyrocket.

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

SUMMARY

Technical solutions (e.g., computing systems, methods, and non-transitory computer readable storage mediums) for managing electronic messages are provided in the present application.

In some implementations, a method for clustering electronic messages includes, at a computing device, causing an electronic message to be displayed to a user in an electronic message folder. Responsive to detecting that the user has read at least a portion of the electronic message, the electronic message is removed from the electronic message folder without user intervention.

In some implementations, the electronic message folder is a message inbox and the electronic message is removed from the message inbox to an archive or delete folder.

In some implementations, the electronic message is removed from the electronic message folder absent an affirmative user action indicating the electronic message is to be maintained in the electronic message folder.

In some implementations, the method also includes, responsive to a predefined user action on the electronic message: maintaining the electronic message in the electronic message folder for a predefined time period and after the predefined time period, causing, without user intervention, the electronic message to be removed from the electronic message folder.

In some implementations, the step of detecting that the user has read at least a portion of the electronic message comprises detecting a predefined user action indicating that the user has completed reading the electronic message.

In some implementations, the electronic message is displayed within a cluster graphic corresponding to a message cluster including a plurality of electronic messages and, in accordance with a determination that a predefined number of electronic messages in the message cluster have been removed from the electronic message folder, without user intervention, the cluster graphic is removed from the electronic message folder.

In some implementations, the method further includes, responsive to a predefined user action on the electronic message, maintaining the electronic message in the electronic message folder.

In some implementations, the method further includes, responsive to a predefined user action on the electronic message, maintaining an electronic message cluster including the electronic message in the electronic message folder.

In other aspects of the present disclosure, computing systems and non-transitory computer storage mediums for executing one or more steps of any of the above-described methods are also disclosed.

DETAILED DESCRIPTION

The implementations described herein provide various technical solutions to efficiently managing electronic messages (e.g., messages within an email inbox), and in particular to the above-identified problems, by providing techniques for managing electronic messages in one or more message folders, and for selectively displaying electronic messages within these folders to a user.

As a non-limiting example, after obtaining a string of electronic messages (e.g., MSG 1, MSG 2, and MSG 3), a user device (e.g., an electronic device that provider a user interface, much as a smartphone, a desktop computer, or a tablet computer) displays these electronics messages in corresponding message folders, e.g., based on content of these electronic messages. For example, MSG 1 and MSG 3, a social network update and an online order tracking status, respectively, are displayed in an email inbox, and MSG 2, an instant message from a known spam account, is displayed in a spam box.

In some cases, after detecting that a user has reviewed at least a portion of MSG 1, the user device removes MSG 1 from the electronic message folder to a trash or archive folder, in order to keep the inbox tidy and organized. This is advantageous, because a tidy and thus more organized message inbox is maintained without requiring user efforts. Intuitively, it is to be appreciated that in some instances, the more messages are kept in an electronic message inbox, the more user effort is likely required to maintain the inbox (and the messages therein), and therefore the less likely it is that a user would diligently maintain (or continue to maintain) the inbox, rendering it easier for the inbox to lapse into a disorganized state.

In some embodiments, after detecting an affirmative user action indicating that MSG 1 is to be actively retained (e.g., staring, flagging, or labeling MSG 1 as important or meriting further review), the user device maintains MSG 1 in the electronic message folder (e.g., email inbox)—rather than automatically removing MSG 1 from the electronic message folder.

In still some other embodiments, to maintain an electronic message folder that is deemed satisfactory (e.g., with a reduced number of message and organized in a visually intuitive way), at least one affirmative user action is needed to keep MSG within the electronic message folder, or MSG 1 will be removed from the electronic message folder to a trash folder. Requiring an—affirmative—user action to maintain a message in an electronic message folder is advantageous, because at least some (although in some cases quite small, e.g., a single mouse click) user efforts are now necessary to add, keep or retain electronic messages in the electronic message folder, and thus by default (e.g., without an affirmative user action) messages are removed (e.g., cleaned out) from the inbox, rendering easier to keep the inbox to a manageable size.

Providing at least these technical effects, the proposed technical solutions described in the present application reduce or eliminate the above-identified technical problems in at least the following ways.

First, users are afforded deference in handling electronic messages. For instance, unlike using a spam folder where electronic messages are deleted permanently regardless of their actual read status (e.g., in a spam folder, unread messages judged, correctly or otherwise, as spam are often deleted without user even noticing them), in some implementations disclosed herein, electronic messages are removed (e.g., from an email inbox) after a user has at least some opportunity to review, cursorily or carefully depending on the circumstances (whether a user is in a hurry or at ease). In some embodiments, the method used to deem a message as "reviewed" and therefore a candidate for deletion is determined by the class of user device the user is using. For instance, in some embodiments, a message is deemed "reviewed" under a first set of circumstances (and therefore a candidate for automatic removal from the inbox) when the user is using a wireless handheld device and a message is deemed "reviewed" under a second set of circumstances (and therefore a candidate for automatic removal from the inbox) when the user is using a desktop device, where the first set of circumstance is different from the second set of circumstances. As an illustrative example, the message is deemed "reviewed" on the handheld when it has been downloaded to the handheld whereas on the desktop the same messaged is not deemed "reviewed" until the message has been opened.

Continuing on with the advantages of the systems and methods of the present disclosure, second, after a user has reviewed (e.g., read the first paragraph of an email's message body), messages not warranting further review or lacking special significance are automatically removed (e.g., to a trash folder)—without requiring great user efforts. For example, ten related marketing emails (e.g., from the same sender) are automatically removed to "trash," once a user has read one email (out of the 10 emails), but exhibited a lack of interest (e.g., in either the 1 read email or the remaining 9 unread ones) by only cursorily reviewing the email's content (e.g., spending no more than 10 seconds on the email that includes a large number of content items, such as inline photos and attachments).

Additional details of implementations are now described in relation to the Figures.

Figure 1:
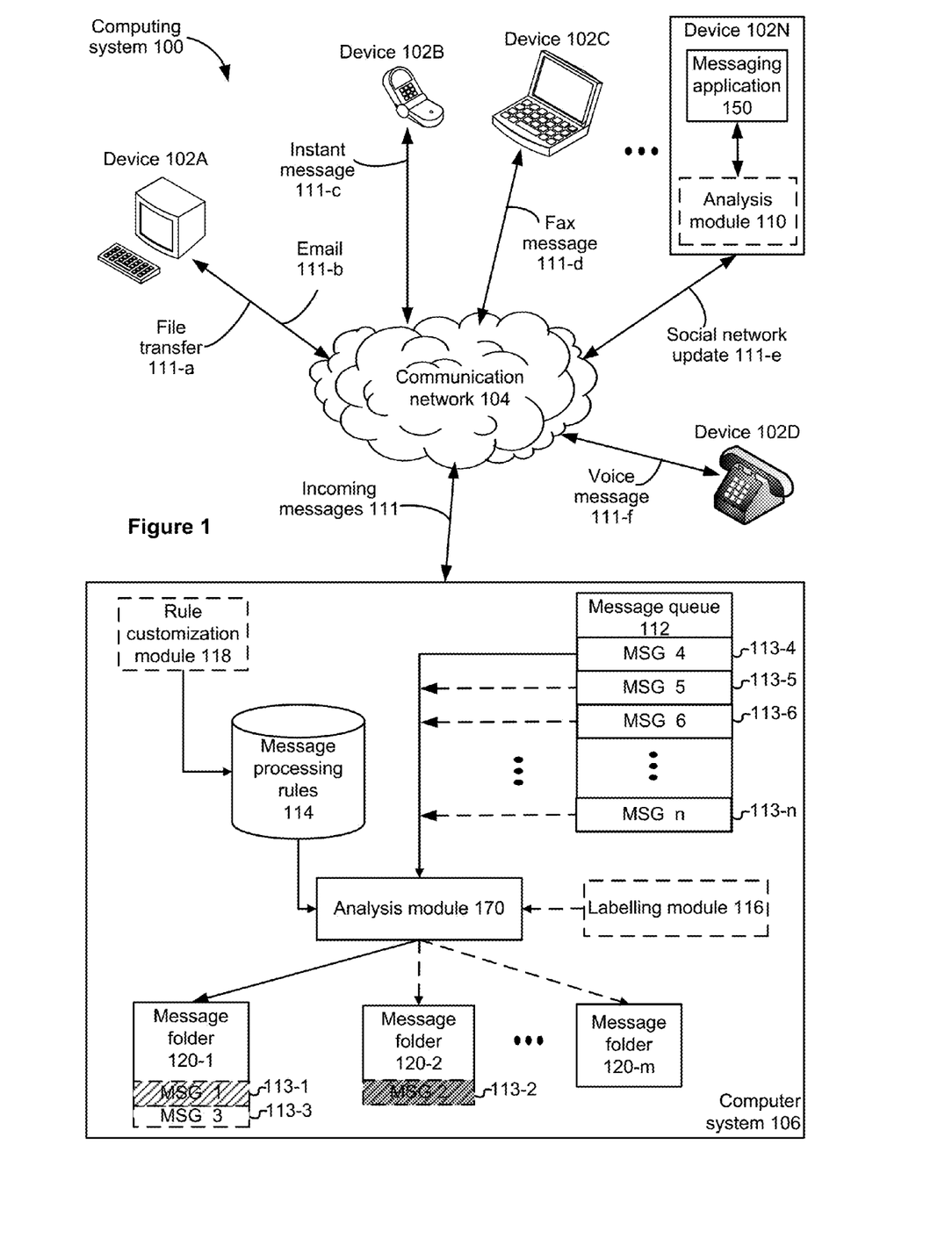
FIG. 1 is an example block diagram illustrating a computing system, in accordance with some implementations.

FIG. 1 is a block diagram illustrating a computing system 100, in accordance with some implementations.

In some implementations, the computing system 100 includes one or more devices 102 (e.g., device 102A, 102B, 102C, 102D . . . , and 102N), a communication network 104, and a computer system 106. In some implementations, a device 102 includes a user interface, with visual or audio means for communication with a user, and is thus a user device. In some implementations, a device 102 is a phone (mobile or landline, smart phone or otherwise), a tablet, a computer (mobile or otherwise), a fax machine, or an audio/video recorder.

In some implementations, a device 102 obtains an electronic message from (e.g., drafted or generated by) a user of the device 102, and transmits the electronic message to the computer system 106 for processing, such as clustering with (e.g., grouping with or separating from) other electronic messages, and for delivery to another device 102. Systems and method for clustering electronic messages are disclosed in U.S. patent application Ser. No. 14/139,205 entitled "Systems and Methods for Clustering Electronic Messages," filed 12/23/2013, which is hereby incorporated by reference herein in its entirety. For example, after determining that user Jack sends an email to user Mary, the device 102 transmits the email to the computer system 106, which clusters messages for Mary and formats the email for display (e.g., determining resolution level, location on a screen to display the email) to Mary. Whereas conversations aggregate electronic messages based on content relatedness (e.g., header content relatedness) between messages already in the conversations and messages being considered for assignment to conversations, electronic messages are organized into clusters without regard to content relatedness between messages within the clusters and messages being considered for assignment to the clusters. For example, a string of messages from and to a first and second user or group of users are good candidates for inclusion in a conversation because of the content relatedness between the messages in the conversations and the messages being considered for the conversations. However, absent some additional criterion or factor, the relatedness in the source and destination of these messages does not serve as a basis for inclusion in the same cluster.

In some implementations, an electronic message is a file transfer 111-*a* (e.g., a photo, document, or video download/upload), an email 111-*b*, an instant message 111-*c* (e.g., a GOOGLE HANGOUT message), a fax message 111-*d*, a social network update 111-*e* (e.g., a GOOGLE PLUS update), or a voice message 111-*f*.

In some implementations, a device 102 includes a messaging application 150 and optionally an analysis module 110 (similar to the analysis module 170 included in the computer system 106).

In some implementations, the messaging application 150 processes incoming and outgoing electronic messages into and from the device 102, such as an outgoing email sent by a user of the device 102 to another user, and a chat message by another user to a user of the device 102.

In some implementations, the analysis module 110 determines whether to remove from or maintain an electronic message in an electronic message folder, after a user has reviewed or read at least a portion of the electronic message. For example, five minutes after a user has opened a brief chat message with no further user action on the chat message, the messaging application 150 deems the user to have finished reviewing the chat message, and therefore causes the chat message to be removed from the electronic message folder (e.g., an incoming chat folder, or an inbox) in which the electronic message was originally located. In another example, after a user has scrolled from the beginning to the end of an email, which in some cases indicates that the user has read the email in its entirety, the messaging application 150 moves the email from an inbox to an archive folder (e.g., when a content-based analysis of the email similar to clustering rules determines e.g., with a 30% confidence level, that the user is likely to review the email again, e.g., when the email is received from the user's close family member) or to a trash folder (e.g., when the content-based analysis determines e.g., with a 90% confidence level, that the user is unlikely to review the email again, e.g., when the email is a news update from the CNN.com website).

These approaches are advantageous, because they allow an electronic message folder to be maintained (e.g., kept tidy and organized) automatically without user intervention, thereby minimizing user efforts and improving user access to messages stored in the message folder. In another example, after a user has hovered a mouse cursor over a snippet (e.g., having less than 20 words) of an electronic message for a predefined time period (e.g., 2 minutes) and moves the mouse cursor away from the snippet, which may indicate that the user has reviewed the snippet (e.g., with great interest or care), the messaging application automatically moves the message from an inbox to an archive folder.

In some implementations, the analysis module 110 resident on the device 102 balances processing load with the analysis module 170 resident on the computer system 106. For example, after a user requests to send out a total of six emails, the analysis module 110 on the device 102 processes the first three emails (which include plain text emails, e.g., without HTML content or attachments, and thus might require less processing power), and the analysis module 170 on computer system 106 processes the remaining three emails (which include HTML content or attachments, and thus might require more processing power).

In some implementations, the communication network 104 interconnects one or more devices 102 with each other, and with the computer system 106. In some implementations, the communication network 104 optionally includes the Internet, one or more local area networks (LANs), one or more wide area networks (WANs), other types of networks, or a combination of such networks.

In some implementations, the computer system 106 (a mail server, an instant messaging server, etc.) includes an analysis module 170, a message queue 112, a set of (e.g., content- or user action-based) message processing rules 114, optionally a labeling module 116, and optionally a rule customization module 118.

In some implementations, the computer system 106 places into or maintains an electronic message in one or more message folders in accordance with the set of processing rules 114 (e.g., system specified or user defined) and/or with user actions with respect to the electronic message.

For example, after detecting that a user has only cursorily reviewed an email (e.g. spending no more than 10 second on a lengthy email), but has not acted affirmatively to indicate a future review is needed (e.g., by pinning the message down in the inbox, or flagging the message as "important" or "for review later"), the computer system removes the email from the user's inbox automatically without user (human) intervention (additional to or beyond cursorily reviewing the email). In another example, after detecting that a user has carefully reviewed a chat log (e.g. slowly scrolling from the beginning of the chat log to the end) thereby indicating that user may have a strong interest in the chat log's content, the computer system (a) maintains the chat log in the user's inbox for a predefined time period (e.g., a week) in anticipation that the user may come back to review the chat log again within a week (because the user was interested in the chat log in the past, and is likely to remain interested in the near future), but (b) after the predefined time period expires (e.g., a week later), automatically removes the chat log from the inbox (e.g., because the user has now indicated, by way of not coming back to the chat log for an entire week, that there may no longer be any remaining interest in the chat log).

In some implementations, the message queue 112 stores (e.g., temporarily or permanently) electronic messages awaiting processing by the analysis module 170, e.g., MSG 4, MSG 5, MSG 6, ... and MSG n (113-4 ... 113-*n*). In some implementations, the message queue 112 includes different types of electronic messages, such as a file transfer 111-*a* (e.g., a photo, document, or video upload), an email 111-*b*, an instant message 111-*c* (e.g., a Google HANGOUT message), a fax message 111-*d*, a social network update 111-*e* (e.g., a GOOGLE PLUS update), or a voice message 111-E In some embodiments, the message queue 112 stores electronic messages addressed to a plurality of users and the analysis module 170 determines which users are receive each of the queued messages. In such embodiments, message folders 120 are indexed not only on a folder type (e.g., category) but also on user identity so that each user in a plurality of users is associated with a corresponding unique plurality of message folders and the analysis module 170 flags messages by category and by user. In some embodiments, all the messages 113 in the message queue are intended for a single recipient and additional instances of messages queue 112 are available for other users. In some embodiments, message folders 120 represent discrete data structures. In some embodiments, message folders represent categories and messages are flagged with one or more such message folder category labels to indicate that such messages are in (belong to) such folders 120.

In some implementations, the analysis module 170 determines whether to remove from or maintain an electronic message in a message folder, after a user has reviewed or read at least a portion of the electronic message. For example, five minutes after a user has opened an electronic message, the messaging application 150 assumes that the user has finished reviewing the electronic message, and therefore causes the electronic message to be removed from the message folder where the electronic message was originally located. In another example, after a user has scrolled from the beginning to the end of an electronic message, which in some cases indicates that the user has reviewed the electronic message (e.g., in its entirety), the messaging applications moves the message from an email inbox to an archive folder or to a trash folder.

These approaches are advantageous because they allow a message folder to be maintained (e.g., kept tidy and organized) automatically without user intervention, thereby minimizing user efforts and improving access to messages stored therein. In another example, after a user has hovered a mouse cursor over a snippet of an electronic message for a pre-defined time period (e.g., two minutes) and moves the mouse cursor away from the snippet, which in some cases indicate that the user has reviewed the snippet (e.g., with great interest or care), the messaging application automatically moves the message from an email inbox to an archive folder.

In some implementations, the analysis module 110 is a software or hardware component resident on the device 102, such as a software package/application or a hardware chipset, for managing electronic messages, and analysis module 170 on server 106 is not used. In some implementations, the analysis module 110 is not present and analysis module 170, which exists separate from or independent of the device 102 is used (e.g., a GOOGLE mail clustering/processing server that is connected with but not part of the device 102, e.g., in the manner depicted in FIG. 1 with analysis module 170). In still other implementations, the analysis module 110 is a software or hardware component resident on the device 102, such as a software package/application or a hardware chipset, for clustering messages, and analysis module 170 on the server 106 is also used. That is, both analysis module 110 on device 102 and analysis module 170 on the server 106 are used. For instance, in some such embodiments some message processing rules 114 (e.g. user-specified rules) are implemented on device 102 and implemented using analysis module 110, while some message processing rules 114 (e.g., system-provided rules) are implemented on the server 106 and implemented using analysis module 170.

In some implementations, the set of (e.g., content-based) message processing rules 114 include system- and user-specified clustering rules. In some implementations, system-provided rules are determined by the computer system 106 (e.g., default rules), and user-specified rules are customized (e.g., added, removed, or modified) by a user.

In some implementations, the labeling module 116 applies one or more labels or flags (e.g., visible to a user or otherwise) to an electronic message, such as a "shipment tracking" label (a user specified label and is thus visible to a user), a "star" (as enabled in a GMAIL application), and an "important" label (a system specified label, and not visible to a user).

In some implementations, the optional rule customization module 118 enables a user to customize the set of processing rules 114 (e.g., adding a new rule, and removing or modifying an existing rule). These approaches enable customization of message processing rules to fit a user's specific needs. For instance, users who work during daytime may glance over personal emails at work, but would likely to read these emails in greater detail when at home. Therefore, a user may specify that during work hours (e.g., from 9 am to 5 pm, Monday through Friday), personal emails are not automatically removed from their inboxes even though the user has read the emails (carefully or cursorily) but that during personal time (e.g., from 5 PM to 9 AM, Monday through Friday, as well as any time during weekend or during holidays), personal emails (e.g., received from a friend or a family member) or chat messages, and marketing emails are automatically removed from their inboxes (e.g., archived or trashed) once the user has read at least a portion of one of these emails.

In some implementations, the one or more message folders 120 (e.g., message folders 120-1, 120-2 . . . , and 120-*m*) maintain electronic messages assigned therein. In some implementations, the message folder 1 (120-1, e.g., an email inbox) include unread messages (e.g., messages or at least a portion thereof, a user has not reviewed/read, also referred to herein as unread messages, e.g., MSG 1113-1), as well as messages (e.g., unread or otherwise) that a user has (e.g., expressly) chosen to keep n the message folder 1 (e.g., MSG 3 113-3), such as a message that a user has starred in a GMAIL application.

In some implementations, the message folder 2 (120-2, e.g., an archive folder) include (e.g., unread or otherwise) messages that a user has (implicitly or expressly) chosen not to maintain in the message folder 1 (e.g., the message 113-2, an instant message or chat that a user has read but did not flag as important).

In some implementations, the message folder m (e.g., 120-*m*, e.g., a trash folder) includes (e.g., unread or otherwise) messages that a user has (implicitly or expressly) chosen not to maintain in either the message folder 1 or the message folder 2.

In some implementations, the labeling module 116 labels (or flags) an electronic message in accordance with which cluster(s) the electronic message has been assigned, or with user actions associated with the electronic message. For example, after an email is assigned to both the "Travel" cluster and the "Promotion" cluster, the labeling module 116 assigns both the label "Travel" and the label "Promotion" to the electronic message. For another example, after a user reads a chat message in detail (e.g., as reflect by how much time the user spent reading the chat and the length of the chat) without flagging it as importance, the labeling module 116 assigns both the label "read" and the label "unimportance" to the chat message. These approaches are advantageous, because message labels may simplify searches and selective retrievals of electronic messages, e.g., electronic messages may be searched, and retrieved, both using labels.

Figure 2:
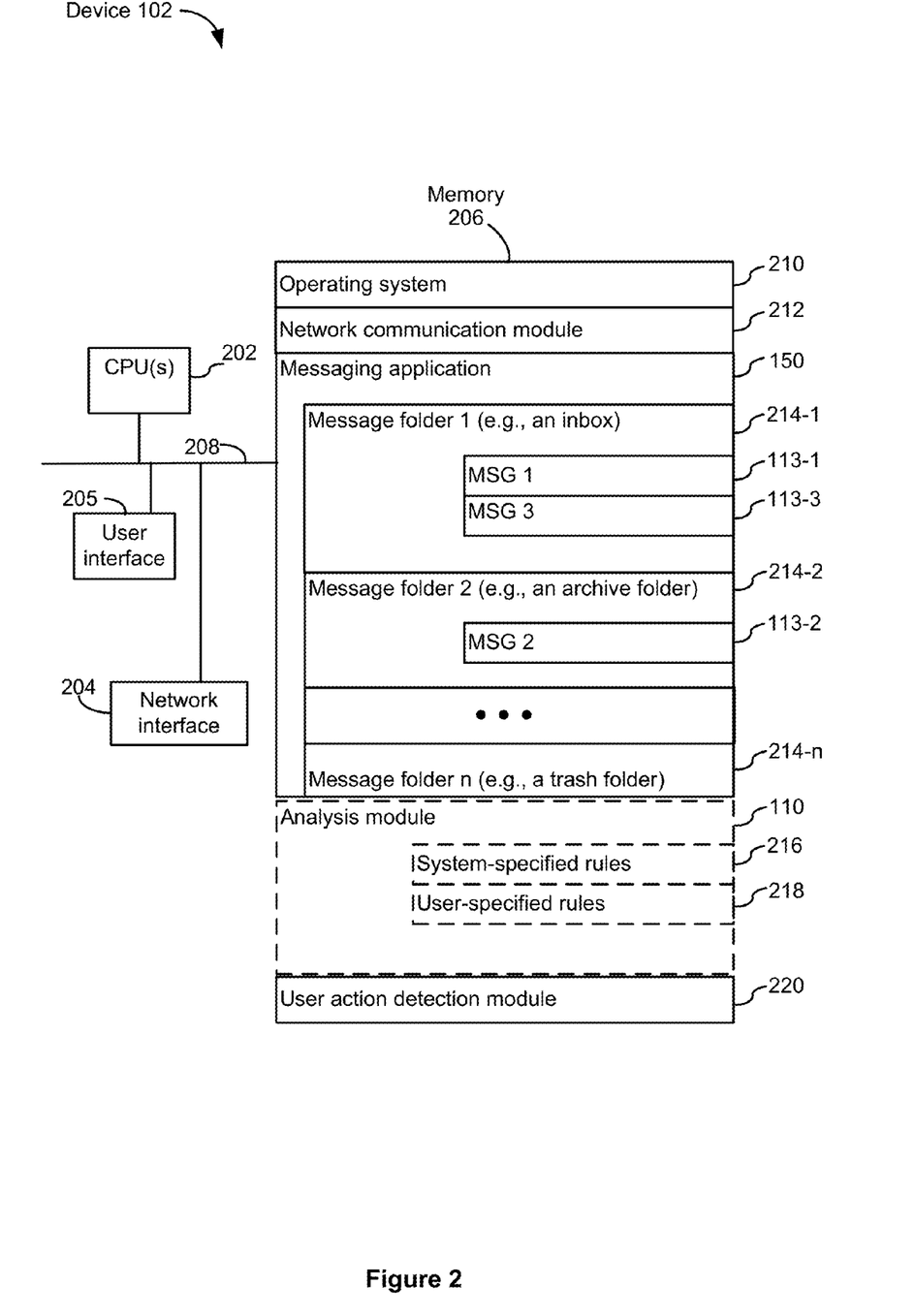
FIG. 2 is an example block diagram illustrating a computing device, in accordance with some implementations.

FIG. 2 is a block diagram illustrating a computing device (also herein called a device) 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the computer system 106 and the devices 102B . . . 102N) via one or more network interfaces 204 (wired or wireless), or the communication network 104 (FIG. 1);
- a messaging application 150 for processing and displaying to a user incoming and outgoing electronic messages using one or more message folders, including:
  - a message folder 1 (e.g., an email inbox) 214-1 for including unread messages (e.g., messages or at least a portion thereof a user has not reviewed/read), as well as messages (e.g., unread or otherwise) that a user has chosen to keep in the message folder 1, such as a message that a user has starred in a GMAIL application, which includes;
    - MSG 1, e.g., an unread email; and
    - MSG 3, e.g., an email that a user has read and starred (or labeled as important);
  - a message folder 2 (e.g., an archive folder) 214-2 for including (e.g., unread or otherwise) messages that a user has (implicitly or expressly) chosen not to maintain in the message folder 1 (e.g., the inbox), which includes;
    - MSG 2, e.g., an email that a user has read, but did not star, pin down, or label as important; and
  - a message folder n (e.g., a trash folder) 214-n for including (e.g., unread or otherwise) messages that a user has (implicitly or expressly) chosen not to maintain in either the message folder 1 (e.g., the inbox) or the message folder 2, e.g., deleted messages;
- optionally an analysis module 110 for placing or maintaining electronic messages in one or more messages folders in accordance with one or more rules (e.g., system specified 216 or user specified 218) and user actions (e.g., detected using the user action detection module 220); and
- a user action detection module 220 for detecting one or more user actions associated with (e.g., with respect to) an electronic message, e.g., whether a user has clicked open an email thereby revealing its entire content or at least a portion thereof (e.g., the first paragraph); and whether a user has scrolled down (e.g., at a fast or slow speed) to the end of a chat log thereby suggesting that the user has (e.g., carefully or cursorily) reviewed the chat log.

In some implementations, the user interface 205 includes an input device (e.g., a keyboard, a mouse, a touchpad, a track pad, and a touch screen) for a user to interact with the device 102, and with the messaging application 150 (as well as electronic messages displayed therein).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
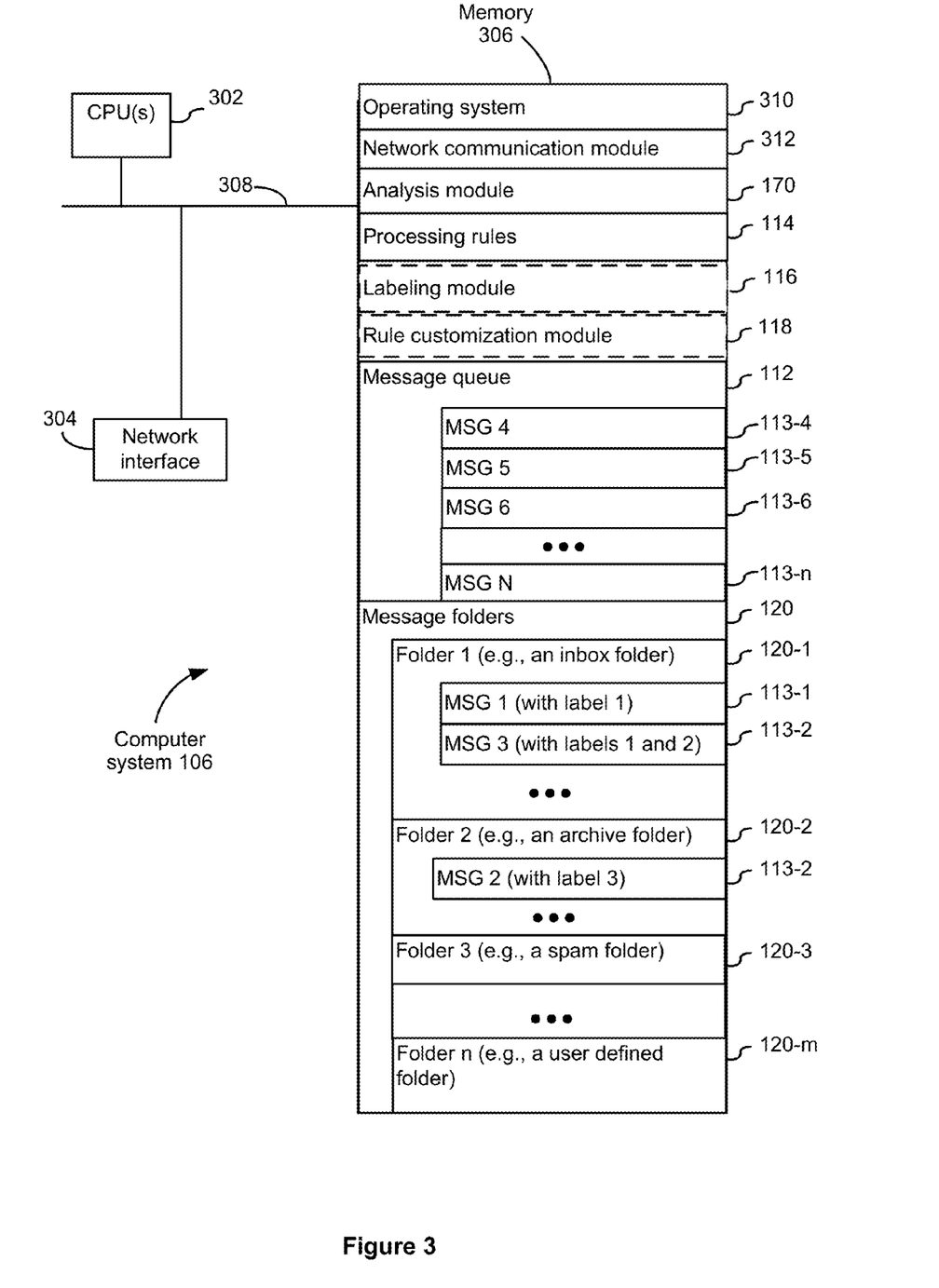
FIG. 3 is an example block diagram illustrating a clustering system, in accordance with some implementations.

FIG. 3 is a block diagram illustrating a computer system 106, in accordance with some implementations. The computer system 106 (e.g., a mail server or an instant messaging server) typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the computer system 106 with other devices (e.g., the devices 102, such as a smartphone or a tablet computer) via the one or more network interfaces 304 (wired or wireless), or the communication network 104 (FIG. 1);
- an analysis module 170 for placing or maintaining electronic messages in one or more messages folders in accordance with one or more processing rules and user actions (e.g., detected using the user action detection module 220 shown in FIG. 2);
- a set of processing rules 114 for including system specified rules 216 or user specified 218 rules for placing messages in one or more different message folders, e.g., (a) if a user has reviewed the first paragraph of an email, but without flagging the email as important, the email may be removed to a trash folder to await permanent removal after seven days, (b) a social network update may be removed to an archive folder once a newer update concerning the same user arrives, regardless whether a user has reviewed the previous update or not (e.g., because the previous update has now become somewhat stale or moot in view of the newer update), (c) a chat message from a close friend shall be maintained in an inbox for at least three days, unless a user has clicked a URL embedded in the chat message (e.g., a link to photos stored on a GOOGLE PICASA website), or (d) messages having been flagged (e.g., starred in a GMAIL application) as important or significant may not be removed from an inbox unless flags are first removed (e.g., un-starring a message in a GMAIL application);
- optionally a labeling module 116 for applying one or more labels or flags (e.g., visible to a user or otherwise) to an electronic message, such as a "shipment track" label (a user specified label and is thus visible to a user), a "star"

(as enabled in a GMAIL application), and an "important" label (a system specified label, and not visible to a user);

optionally a rule customization module 118 for enabling a user to customize the set of processing rules 114 (e.g., adding a new rule, and removing or modifying an existing rule);

a message queue 112 for storing (e.g., temporarily or permanently) electronic messages awaiting processing by the analysis module 170, e.g., MSG 4, MSG 5, MSG 6, ... and MSG n (113-4 ... 113-*n*);

one or more message folders 120 for maintaining electronic messages assigned therein, which in some implementations include:

a message folder 1 (e.g., an email inbox) 120-1 for including unread messages (e.g., messages or at least a portion thereof a user has not reviewed/read), as well as messages (e.g., unread or otherwise) that a user has chosen to be kept within the message folder 1, such as a message that a user has starred in a GMAIL application, which includes;

MSG 1 with label 1, e.g., an unread email with an "unread" label; and

MSG 3 with label 1 and label 2, e.g., an email that a user has not read and but starred (e.g., an "unread" label and an "important" label);

a message folder 2 (e.g., an archive folder) 120-2 for including (e.g., unread or otherwise) messages that a user has (implicitly or expressly) chosen not to maintain in the message folder 1 (e.g., the inbox), which includes;

MSG 2 with label 3, e.g., an (e.g., automatically without user intervention) archived email (with an "archive" label), which a user has read but did not star, pin down, or label as important;

a message folder 3 (e.g., a spam folder) 120-3 for including (e.g., unread or otherwise) spam messages; and a message folder m (e.g., a user-defined folder) 120-*m* (e.g., a folder create by a user for storing "emails from friends").

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and a "computer system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
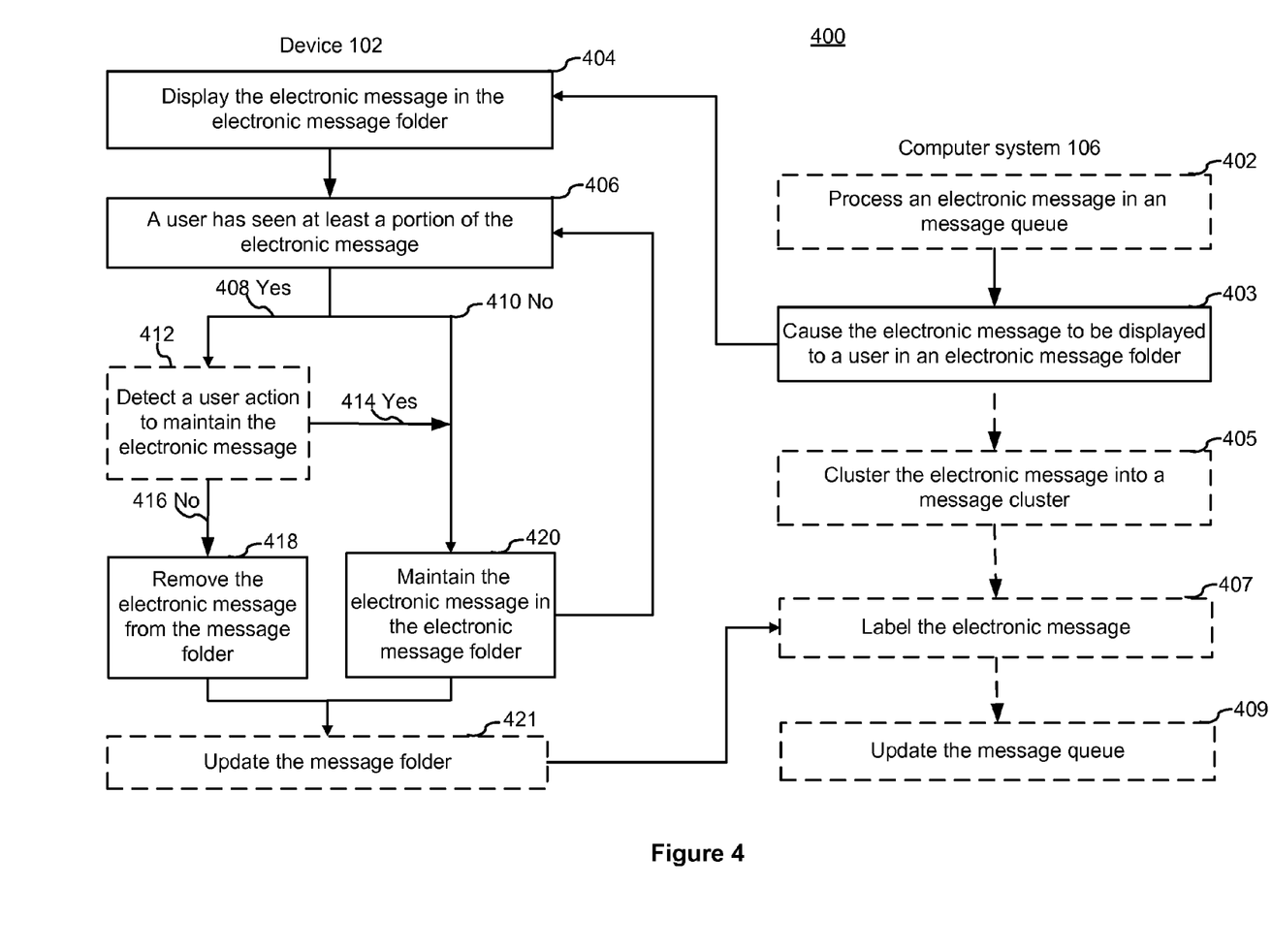
FIG. 4 is an example flow chart illustrating a method for clustering electronic messages in a computing system, in accordance with some implementations.

FIG. 4 is a flow chart illustrating a method for managing electronic messages in a computing system, e.g., implemented at device 102 or at the computer system 106, in accordance with some implementations.

In some implementations, the computer system 106 (e.g., a mail server) begins processing (402) an electronic message (e.g., an email, a chat message, a social network update) within a message queue.

Figure 6A:
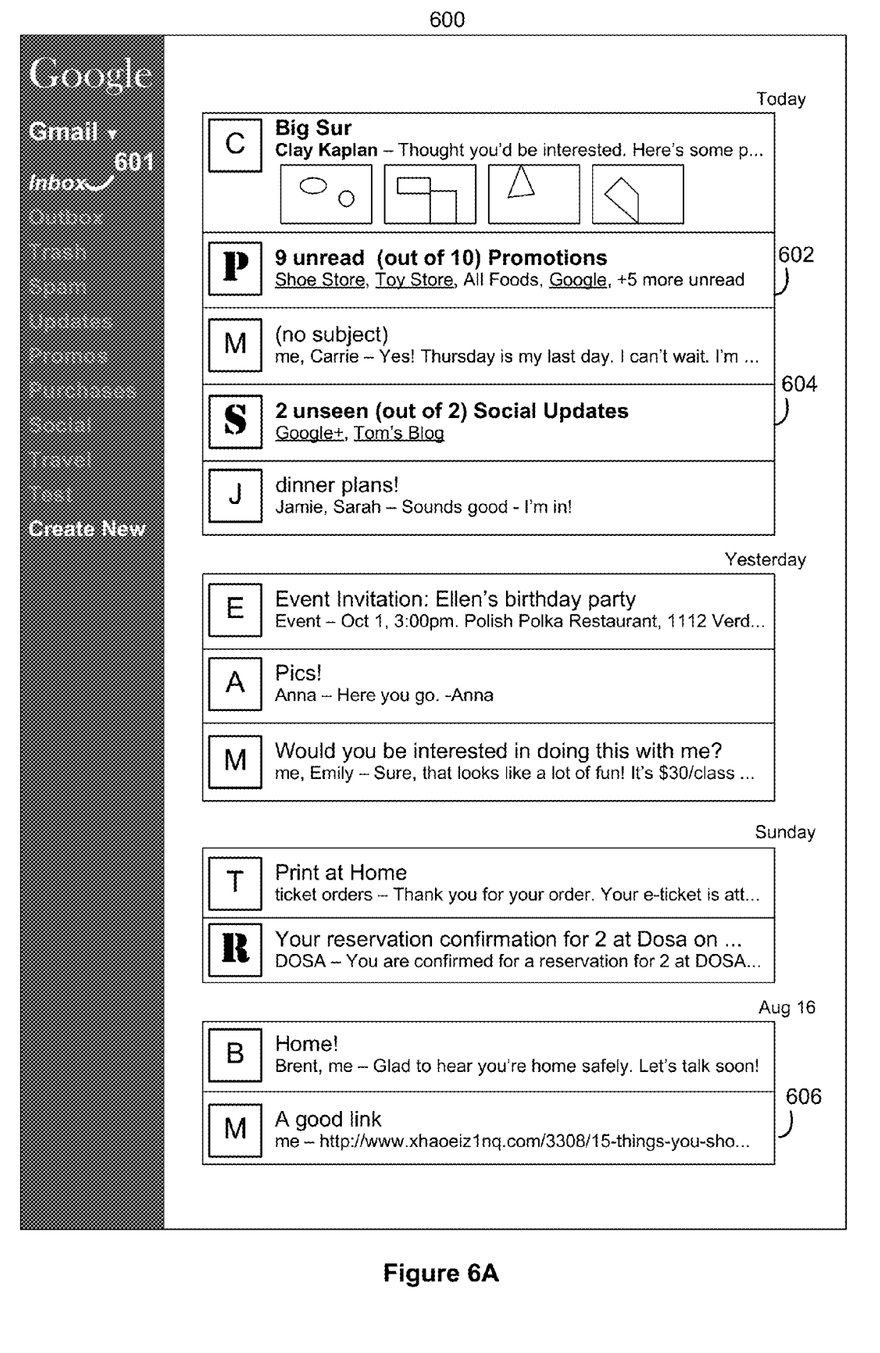
FIGS. 6A-6B are screen images showing an example user interface for displaying clustered electronic messages, in accordance with some implementations.

In some implementations, as part of (e.g., before, after, or concurrently with) processing the electronic message, the computer system 106 causes (403) the electronic message to be displayed to a user in an electronic message folder (e.g., a GMAIL inbox, as shown in FIG. 6A).

In some implementations, the electronic message is displayed as an individual message (e.g., message 606 shown in FIG. 6A). In other implementations, the electronic message is clustered (405, e.g., by the computer system 106) into a message cluster, and displayed as part of a message cluster graphic (e.g., the message cluster graphic 602 shown in FIG. 6A) that represents the message cluster.

In some implementations, the device 102 (e.g., a smartphone, such as a GOOGLE ANDROID phone) displays (404) the electronic message in the electronic message folder (e.g., the inbox 601) for a user to review.

In some implementations, the device 102 detects (406, e.g., periodically, on a predefine time schedule or otherwise) whether a user has reviewed at least a portion of the electronic message. For example, every 10 seconds, the device detects whether a user has clicked open the electronic message or hovered over the electronic message for more than a predefined time period (e.g., 1 minute), either of which may indicate that the user has read the electronic message (in its entirety or a significant portion thereof).

In some implementations, if a user has not ("No" 410) read at least a portion of the electronic message (e.g., the electronic message remains unread), the device 102 maintains the electronic message in the electronic message folder (e.g., the inbox). For example, if a user has not seen message body (or first 3 paragraphs) of the electronic message (even though the user may have seen a snippet of the electronic message, such as when an email is displayed in a compact view in a GMAIL application), the electronic message is kept in the inbox, so as to provide a user at least some opportunity to review before the electronic message is removed from the inbox (and the user's review). In these implementations, affording an opportunity for a user to review a message is preferred to other considerations, such as removing stale messages from an inbox (e.g., a GOOGLE PLUS update concerning breaking news on a Friday night may become stale 3 hours after, even though a user does not notice (let alone reviewed) it until the Wednesday in the following week). Note that these approaches differ from those used in a spam folder in at least that, in spam folders, messages are often removed (e.g., deleted permanently) even before a user has an opportunity to review.

In some implementations, if a user has ("Yes" 408) read at least a portion of the electronic message (e.g., the message body, the subject line, a signature block, a message snippet, the first paragraph, or the first ten lines), the device 102 detects (412) a predefined user action to decide whether to (a) remove the electronic message from the message folder (418) or (b) maintain the electronic message in the message folder (420).

In some implementations, when the device 102 does detect ("Yes" 414) a predefined user action to maintain the electronic message in the electronic message folder (e.g., when a user opens an email in its full view and maintains the full view for more than 5 minutes, suggesting that the user is reading the emails' content, when the user flags the email by starring it as enabled in an GMAIL application, or when the user applies a particular label to the email), the device 102 concludes that the user is (or will likely be) interested in the electronic message (e.g., the content therein), and thus maintains (420) the electronic message from the message folder (e.g., the inbox), as to improve user access to messages in which the use has expressed interested.

In some implementations, when the device 102 does not ("No" 416) detect a predefined user action to maintain the electronic message in the electronic message folder (e.g., when a user opens an email in its full view, but returns to a compact view shortly thereafter, without starring or labeling the email as "important"), the device 102 concludes that the user is not (or will likely not be) interested in the electronic message (e.g., the content therein), and thus removes (418) the electronic message from the message folder (e.g., the inbox), as to maintain only a reduced number of messages in the message folder (e.g., to keep the inbox tidy).

In some implementations, the device 102 updates 421 the message folder in accordance with one or more of the previous determinations (e.g., 408, 410, 414, and 416). For example, the device 102 re-prioritizes (e.g., ordering in a different sequence) messages in the electronic message folder, after a message is removed.

In some implementations, in accordance with one or more of the previous determination (e.g., 408, 410, 414, and 416) (e.g., by the device 102), the computer system 106 labels (407) the electronic message. For example, in accordance with a determination that a user has viewed an email, but fails to affirmatively act to maintain the email in an inbox, a mail server labels the email as "not interesting," "not important," or "trash."

In some implementations, in accordance with one or more of the previous determinations (e.g., 408, 410, 414, and 416) (e.g., by the device 102), the computer system 106 further updates (409) the message queue. For example, in accordance with a determination that a user has viewed an email, but fails to affirmatively act to maintain the email in an inbox, a mail server removes the email from the message queue, and places the email in a "to-be-deleted" or "trash" queue, where the email will be deleted (e.g., permanently) after a predefined time period (e.g., emails in a trash folder are deleted permanently every 3 months).

Figure 5A:
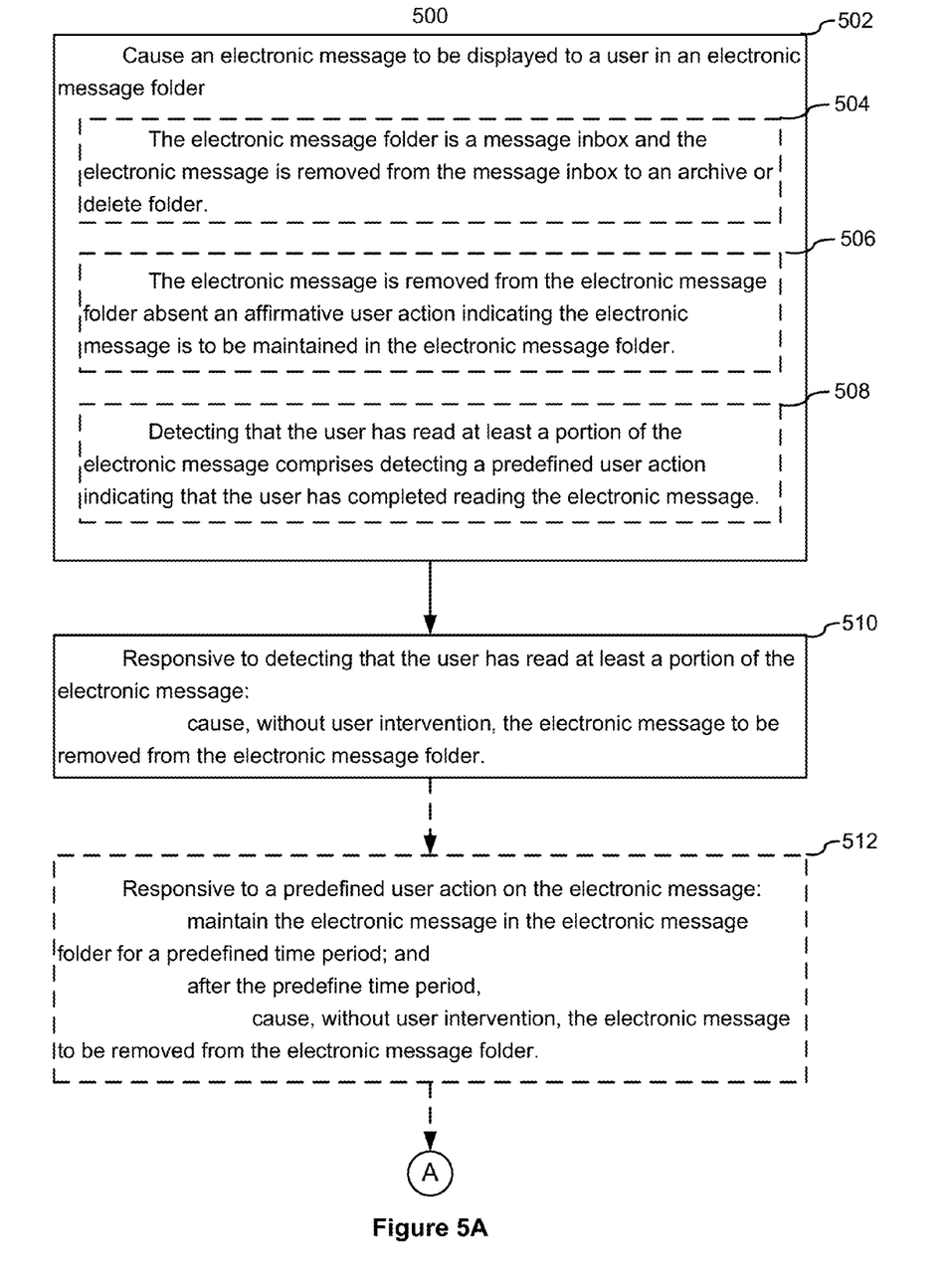
FIGS. 5A-5B are example flow charts illustrating methods for clustering electronic messages, in accordance with some implementations.
Figure 5B:
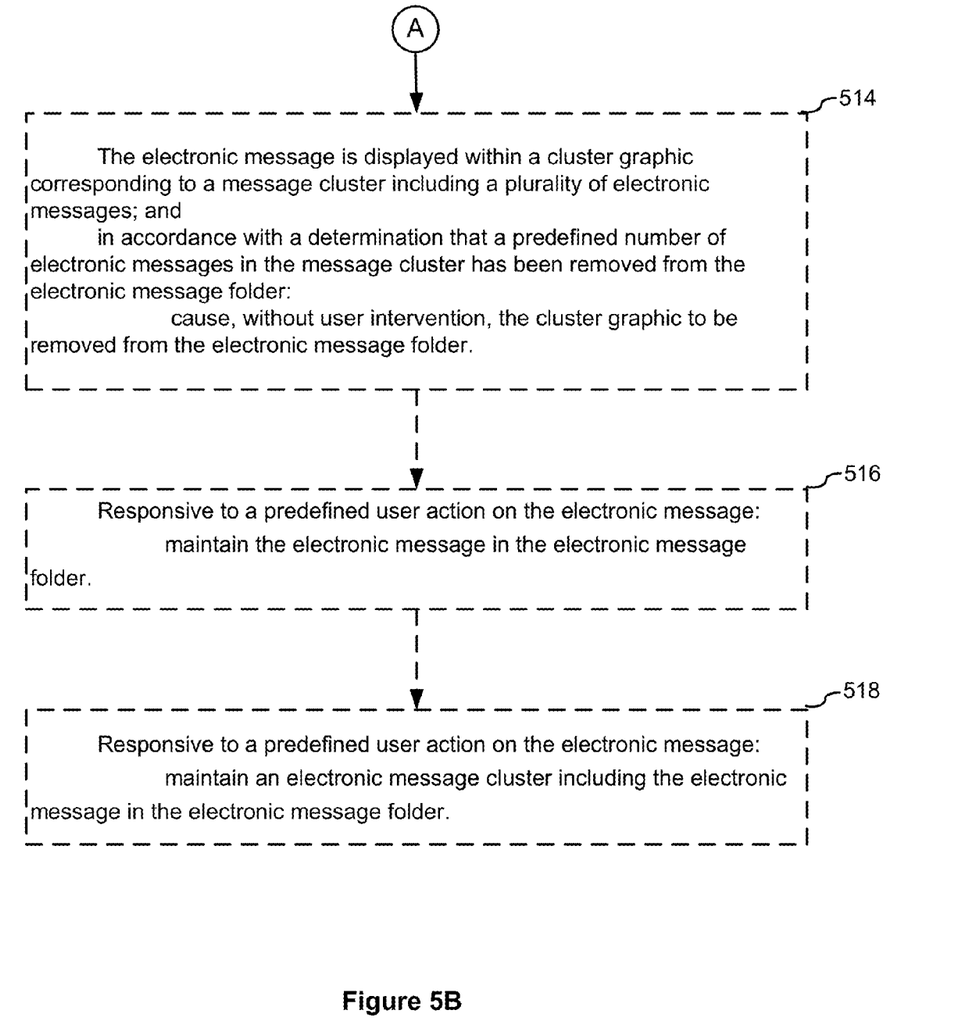

FIGS. 5A-5B are example flow charts illustrating a method 500 for managing electronic messages, in accordance with some implementations. In some implementations, the method 500 for managing electronic messages is performed at a computing system, e.g., the computer system 106 or the device 102. In some implementations, the computer system includes one or more processors and memory storing one or more programs for execution by the one or more processors.

In some implementations, the computing system causes (502) an electronic message to be displayed to a user in an electronic message folder. For example, as shown in FIG. 6A, message clusters 602 and 604 (and individual messages within these clusters), as well as message 606 is displayed within inbox 601. More specifically, the message cluster 602 includes 9 Promotion messages; the message cluster 604 includes 2 Social messages; and the message 606 is an individual email.

Figure 6B:
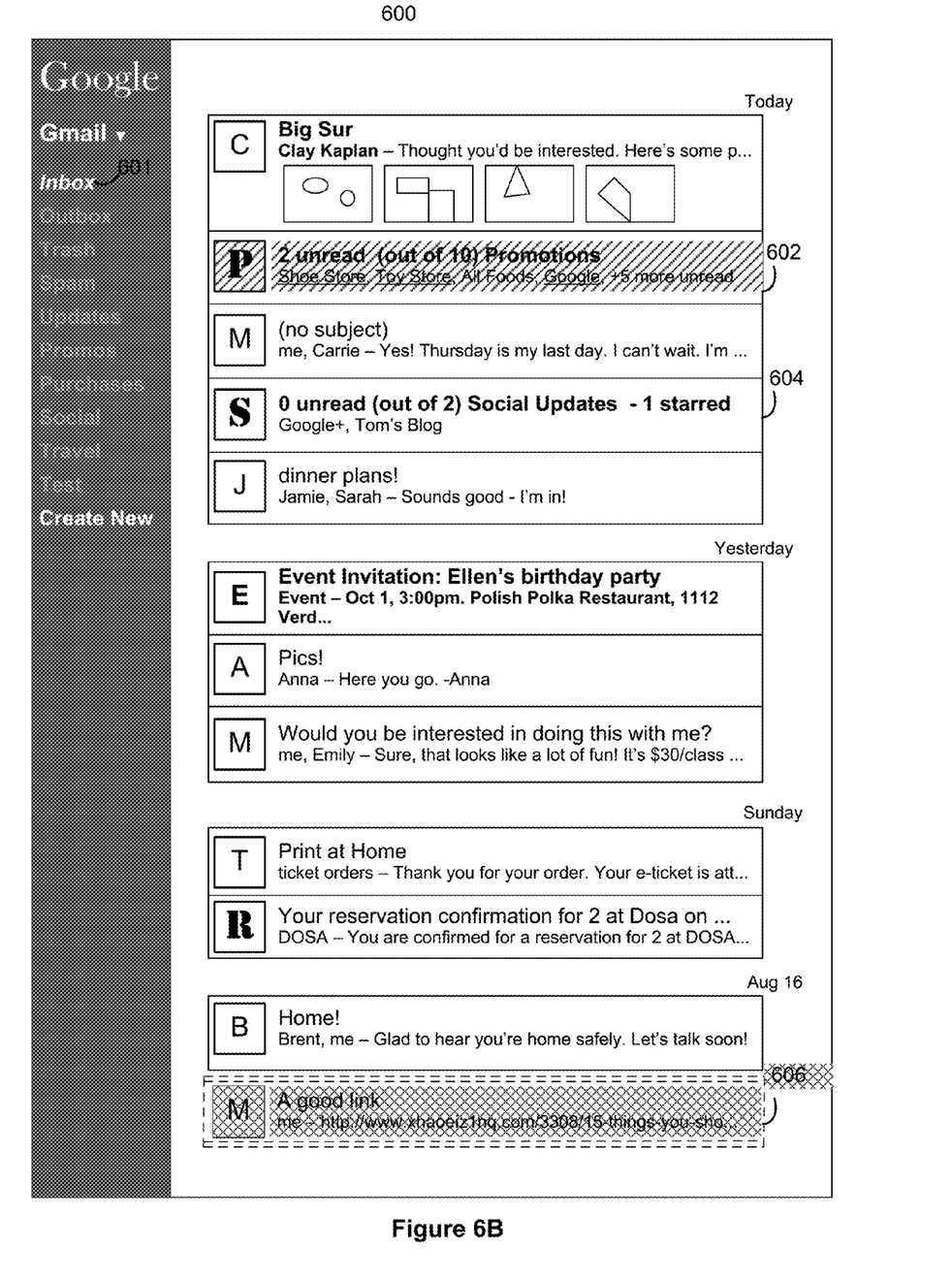

In some implementations, a function called auto inbox clean up (or auto message removal) is provided. In some implementations, the electronic message folder is (504) a message inbox and the electronic message is removed from the message inbox to an archive or delete folder. For example, as shown in FIG. 6A, after displaying an email 606 in an inbox 601 to a user, and obtaining indication that the user has read or reviewed at least a portion (e.g., a message snippet "http://www.xhaoeizlnq.com/3308/15-things-you-sho" or a subject line "A good link") of the email 606, the computing system automatically removes the email from the inbox 601 (sometimes also called cleaning the Promotion email out of the inbox). For example, as shown in FIG. 6B, message 606 has been automatically (e.g., without user/human intervention) removed from the inbox 601 (as indicated by shades over the message 606).

In some implementations, whether a user has read at least a portion of a message is determined by analyzing one or more actions the user has taken with respect to the message. For example, in some cases, a computing system determines that a user has read a portion of a message, when (a) the user has hovered a mouse cursor over the message for more than 2 minutes, (b) after the user has clicked open the message (e.g., causing the message to be displayed from a snippet/compact view to a full view, and thus revealing more content therein), or (c) after the user has moved a mouse cursor from one location (e.g., top left corner) within a message to another location (e.g., top left corner) within the message, indicating that the user was reading through the message (e.g., line by line, paragraph by paragraph, or section by section). In some embodiments this determination is based, at least in part, in the device class 102 the user is using.

In some implementations, a user's affirmative action (as opposed to inaction or lack of an action) is needed to maintain (e.g., keep) an email (a portion of which the user has seen/read/reviewed) in an inbox. In some implementations, the electronic message is removed (506) from the electronic message folder absent an affirmative user action indicating the electronic message is to be maintained in the electronic message folder. For example, after opening an email, a user can pin the email down in order to keep it in an email inbox. Otherwise, the email will be automatically reviewed within a predefined time period (e.g., 10 second) after a user has finished reviewing its content (e.g., existing the email after scrolling to the bottom of the email). These approaches are advantageous, because not only a reduced number of messages are kept in a message inbox, but also, to keep a message (a portion of which has been displayed to a user or a user has seen) in an inbox, affirmative user actions are needed, which expressly or explicitly indicate that the message is of an increased or special significance to a user. In these implementations, a user would need to affirmatively communicate to the computing system, their desire to keep a message in an inbox (e.g., by pinning the message down or flagging it as "to be kept"). Otherwise, the message is removed automatically from the inbox once a user has done reviewing its content. In some implementations, when a user takes such an express/affirmative action, however, the computing system determines that a message is likely of importance or significance to the user. This determination can also be used in other scenarios, such as prioritizing the display of the message (e.g., moving the message to the top of the inbox, or displaying the message more conspicuously, e.g., with a more visually noticeable, bolder or larger, font) among several messages, or constructing rules for determining what type of content are likely of interest (e.g., importance) to the user in the future (e.g., if a user is interested in promotional emails concerning hunting outfits, the user is also likely interested in receiving paper coupons on hunting weapons and ammunitions," which may be sent to the user by postal mail).

In some implementations, a message is automatically removed from an inbox after a user has viewed (e.g., read) a significant portion of the message (e.g., its entirety, or at least the message body—as opposed to only the subject line or the sender list). In some implementations, detecting that the user has read at least a portion of the electronic message comprises (508) detecting a predefined user action indicating that the user has completed reading the electronic message. In some implementations, whether a user has completed reading the electronic message in its entirety is determined by detecting predefined user actions with respect to the message, for example (a) whether a user has scrolled from the beginning of a message down to the end of the message; and (b) whether a user has spent more than a predefined time period reading the message, which is determined in accordance with the message's length (e.g., 10 second for a one-liner email; 2 minutes for an email with a photo attachment, but without text; and 30 minutes for an email that includes a 20 page MICROSOFT WORD attachment).

These approaches are advantageous in that they provide users a meaningful opportunity to review a message's content (e.g., in its entirety), before removing the message from an inbox (which may reduce the likelihood that the message would be reviewed again by the users, e.g., after the message is removed, from the inbox, to a trash folder or an archive folder).

FIGS. 6A-6B are screen images showing an example user interface for displaying clustered electronic messages, in accordance with some implementations.

In FIG. 6A, the user interface 600 includes a messaging application (e.g., a GMAIL application). In the email application, as shown in FIG. 6A, an inbox 601 is displayed. The email inbox 601 includes (e.g., displays) a plurality of message cluster graphics (e.g., a "Promotion" message cluster graphic 602 and a "Social" message cluster graphic 604), as well as a plurality of individual electronic messages (e.g., an email 606).

As shown in FIG. 6A, the "Promotion" message cluster graphic 602 includes 10 "Promotion" messages, nine of which have not been reviewed (e.g., "unread") by a user.

In some implementations, messages (or a particular portion thereof, e.g., message body or an attachment) that have not been reviewed by a user (also referred herein as unread messages) are displayed in a visually distinctive manner from messages that have already been reviewed by a user. For example, unread messages are underlined, while messages that have been read are not, unread messages are shown in a different font from those that have been read.

In some implementations, an individual message is automatically removed from an inbox, after a user has reviewed the message, but did not (e.g., or failed to) take any affirmative action to keep the message in the inbox, within a predefined time period after exiting the message. For example, as shown in FIG. 6B, the computing system removes the message 606 from the inbox 601 (as indicated by the cross shades thereover), after determining that a user does not label it as "important" within 1 minute of exiting the message 606.

These approaches are advantageous, because when a user has reviewed a message, but does not take any further action, the computing system can in some implementations reasonably conclude that the user might no longer be interested the message (e.g., the content therein), and as such remove the message from the inbox, in order to keep the inbox organized (e.g., by keeping only message that user are still interested in the inbox).

In some implementations, a message cluster is automatically removed from an inbox when a user has reviewed a predefined number of messages within the cluster, but did not appear interested in any of those messages. For example, as shown in FIG. 6B, the computing system removes the message cluster 602 from the inbox 601 (as indicated by the shades thereover), after determining that a user has reviewed (e.g., read) a predefined number of messages within the message cluster 602. In another example, after determining that a user has read 8 out of 10 "Promotion" messages (thus leaving "2 unread . . . Promotions") within the "Promotion" message cluster, the computing system concludes that the user may no longer be interested in the remaining 2 unread messages in particular (or the "Promotion" cluster in general), and therefore removes the message cluster 602 from the inbox 601.

These approaches are also advantageous, because when a user has reviewed a predefined number of messages with in a message cluster, but does not take any action indicating that they are interested in any of those message, the computing system may reasonably conclude that the user might no longer be interested in not only the predefined number of messages they have reviewed, but also the remaining messages within the message cluster (even though they have not had reviewed those remaining message). For example, if a user has reviewed 9 (out of a total of 10) promotional emails, but does not express any particular interest (e.g., by pinning a promotional email down, thereby keeping it in the inbox; by moving the promotional email to a "important files only" folder; or by flagging or starring the promotional email, as enabled in an GMAIL application), in some cases, the entire "Promotion" message cluster may be removed from the inbox.

In some implementations, a feature sometimes called "Interested in one? Keep them all." is enabled. In some implementations, a message cluster is maintained in—rather than automatically removed from—an inbox, when a user has reviewed a predefined number of messages within the cluster, and appears to be interested in at least one message within the predefined number of messages. For example, as additionally shown in FIG. 6B, the computing system maintains (e.g., keeps) the message cluster 604 (e.g., in its entire) in the inbox 601, after detecting that a user has reviewed (e.g., read) a predefined number of messages within the message cluster 602, and starred at least one of those messages (thereby indicating an increase level of interest in the at least one message in particular, and possible in the entire message cluster in general). These approaches are advantageous, because when a user has affirmatively expressed an (e.g., increased) interest in one message, the computing system can reasonably conclude that the user might be interested in its related messages—e.g., read or unread. In cases where a related message has been read, it can be reasonably conclude that a user might become interested in the related messages in the future (also called, come back to a message), despite the current lack of interest (as indicated by the fact that the user has reviewed the related messages, but failed to take an affirmative action to keep those messages).

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms.

These terms are only used to distinguish one element from another. For example, a first electronic message could be termed a second electronic message, and, similarly, a second electronic message could be termed a first electronic message, without changing the meaning of the description, so long as all occurrences of the "first electronic message" are renamed consistently and all occurrences of the "second electronic message" are renamed consistently. The first electronic message and the second electronic message are both electronic messages, but they are not the same electronic message.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
    at a computing device having one or more processors and memory storing one or more programs configured for execution by the one or more processors:
        displaying an indication of an electronic message to a receiving user within a cluster graphic corresponding to a first message cluster in a plurality of message clusters, wherein the first message cluster includes a plurality of electronic messages, and wherein the plurality of message clusters is in an inbox folder;
        detecting that the receiving user has read at least a portion of the electronic message other than the indication of the electronic message;
        determining whether the receiving user has taken an affirmative action to retain the indication of the electronic message in the cluster graphic within a predefined time period after detecting that the receiving user has read at least a portion of the electronic message, wherein the affirmative action comprises pinning the electronic message or flagging the electronic message to be kept;
        when it is determined that the receiving user has not taken the affirmative action, automatically removing the indication of the electronic message from the cluster graphic and automatically removing the electronic message from the message inbox to an archive or delete folder; and
        when it is determined that the receiving user has taken the affirmative action, retaining the indication of the electronic message in the cluster graphic.

2. The method of claim 1, wherein the detecting that the receiving user has read at least a portion of the electronic message comprises detecting a predefined user action indicating that the receiving user has completed reading the electronic message.

3. The method of claim 1, further comprising ceasing to display the cluster graphic when a predefined number of electronic messages in the first message cluster have had corresponding indications removed from the cluster graphic.

4. A computing system, comprising:
    one or more processors;
    memory; and
    one or more programs, wherein the one or more programs are stored in the memory, configured for execution by the one or more processors, and include instructions for:
        displaying an indication of an electronic message to a receiving user within a cluster graphic corresponding to a first message cluster in a plurality of message clusters, wherein the first message cluster includes a plurality of electronic messages, and wherein the plurality of message clusters is in an inbox folder;
        detecting that the receiving user has read at least a portion of the electronic message other than the indication of the electronic message;
        determining whether the receiving user has taken an affirmative action to retain the indication of the electronic message in the cluster graphic within a predefined time period after detecting that the receiving user has read at least a portion of the electronic message, wherein the affirmative action comprises pinning the electronic message or flagging the electronic message to be kept;
        when it is determined that the receiving user has not taken the affirmative action, automatically removing the indication of the electronic message from the cluster graphic and automatically removing the electronic message from the message inbox to an archive or delete folder; and
        when it is determined that the receiving user has taken the affirmative action, retaining the indication of the electronic message in the cluster graphic.

5. The system of claim 4, wherein the detecting that the receiving user has read at least a portion of the electronic message comprises detecting a predefined user action indicating that the receiving user has completed reading the electronic message.

6. The system of claim 4, wherein the one or more programs further comprise instructions for ceasing to display the cluster graphic when a predefined number of electronic messages in the first message cluster have had corresponding indications removed from the cluster graphic.

7. A non-transitory computer readable storage medium storing one or more programs configured for execution by one or more processors of a computing system, the one or more programs comprising instructions for:

displaying an indication of an electronic message to a receiving user within a cluster graphic corresponding to a first message cluster in a plurality of message clusters, wherein the first message cluster includes a plurality of electronic messages, and wherein the plurality of message clusters is in an inbox folder;

detecting that the receiving user has read at least a portion of the electronic message other than the indication of the electronic message;

determining whether the receiving user has taken an affirmative action to retain the indication of the electronic message in the cluster graphic within a predefined time period after detecting that the receiving user has read at least a portion of the electronic message, wherein the affirmative action comprises pinning the electronic message or flagging the electronic message to be kept;

when it is determined that the receiving user has not taken the affirmative action, automatically removing the indication of the electronic message from the cluster graphic and automatically removing the electronic message from the message inbox to an archive or delete folder; and     when it is determined that the receiving user has taken the affirmative action, retaining the indication of the electronic message in the cluster graphic.

8. The method of claim 1, wherein the indication of the electronic message is a snippet drawn from the electronic message.

9. The system of claim 4, wherein the indication of the electronic message is a snippet drawn from the electronic message.

\* \* \* \* \*